United States Patent [19]

Naruse et al.

[11] Patent Number: 4,779,787
[45] Date of Patent: Oct. 25, 1988

[54] WELDING SYSTEM

[75] Inventors: Kazuo Naruse, Okazaki; Hideaki Tobita, Toyota, both of Japan

[73] Assignee: Toyota Jidosha Kabushiki Kaisha, Toyota, Japan

[21] Appl. No.: 45,053

[22] Filed: May 1, 1987

[30] Foreign Application Priority Data

Sep. 1, 1986 [JP] Japan .................. 61-205334

[51] Int. Cl.⁴ ............................................ B23K 37/04
[52] U.S. Cl. ........................................ 228/47; 219/80
[58] Field of Search ............... 228/47, 49.1, 49.2; 198/346.1, 346.2; 219/79, 80, 86.8

[56] References Cited

U.S. PATENT DOCUMENTS

| | | | |
|---|---|---|---|
| 4,400,607 | 8/1983 | Wakou | 219/86.8 |
| 4,441,645 | 4/1984 | Takagishi | 228/47 |
| 4,494,687 | 1/1985 | Rossi | 228/47 |
| 4,548,346 | 10/1985 | Kraus | 228/47 |
| 4,593,850 | 6/1986 | Ariga | 228/47 |

FOREIGN PATENT DOCUMENTS

| | | | |
|---|---|---|---|
| 2810822 | 9/1978 | Fed. Rep. of Germany | 228/47 |
| 3228378 | 2/1984 | Fed. Rep. of Germany | 228/47 |
| 0872146 | 10/1981 | U.S.S.R. | 228/47 |

Primary Examiner—Kurt Rowan
Attorney, Agent, or Firm—Finnegan, Henderson, Farabow, Garrett & Dunner

[57] ABSTRACT

A welding system for welding works such as floor parts of different models of automobiles has a first carrier passage provided at one end thereof with a loading stage and at the other end thereof with a welding stage where an automatic welder is provided, a second carrier passage which intersects the first carrier passage, a turn-over stage provided at the position where the first and the second carrier passages intersect each other, a plurality of jig unit carriages each carrying the parts to be welded and adapted to run along the first and the second carrier passages, linear motors arranged along the first and the second carrier passages, and a lifting device disposed at the turn-over stage and adapted for lifting the carriage as necessitated.

4 Claims, 10 Drawing Sheets

WELDING SYSTEM

FIELD OF THE INVENTION AND RELATED ART STATEMENT

The present invention relates to a welding system, and more particularly to a welding system which can be applied to assembly of chassis of a variety of types of automobiles.

Hitherto, various welding systems have been proposed for the purpose of automation of welding process for the assembly of chassis of automobiles, particularly floor parts such as front and rear floors. One of these welding systems employs a pair of rails fixedly laid on a bed and a jig carriage which is carried upon the rails for movement back and forth therealong. The jig carriage carries a jig unit which includes one of more work supporting members, a reference pin, a back electrode and so forth. The welding system also has a frame which is fixed to the bed and constituted by a pair of posts and a bar extending between the posts. Welding guns of a multi-spot welder are fixed to the frame. In operation, the jig carriage carrying the jig unit, in which a work is fixedly mounted on the back electrode, is moved to a position near the frame, where spot welding is conducted by the welding guns.

Another welding system is disclosed in Japanese Unexamined Patent Publication No. 104476/1982, in which a group of milti-spot welders and a group of welding robots are arranged separately; and fixtures on the multi-spot welders are adapted to be exchanged with another type of fixtures, whereby the welding system can conduct welding of two different kinds of work. In still another welding system disclosed in Japanese Unexamined Patent Publication Nos. 50853 and 50854/1984, trolley hangers, each having two pairs of hook portions are circulated along a closed loop shape trolley circulation path.

These known welding systems, however, suffer from a disadvantage in that they are not designed for welding of a variety of types of work, so that the welding system as a whole has to be changed each time the type of the work to be processed is changed. Another problem encountered by these known welding systems; is that, the operation of the system has to be suspended for an impractically long time when the jig unit is modified.

The proposal made in Japanese Unexamined Patent Publication No. 104476/1982 relates to the arrangement of the welder, while the proposals in Japanese Unexamined Patent Publication Nos. 50853 and 50854/1984 relate to the arrangement in which the trolley hangers suspending works are circulated along the circulation rail. Thus, these proposals do not provide any solution to the problems explained above.

OBJECT AND SUMMARY OF THE INVENTION

Accordingly, an object of the present invention is to provide a welding system which can cope with demands for production of a variety of works and which can locate the parts precisely so as to ensure a high quality of the products.

To that end, according to the present invention, there is provided a welding system which comprises a plurality of carriages, a first carrier passage, a second carrier passage intersecting the first carrier passage at an intersection thereof with a height difference, a loading stage provided in the first carrier passage, at which a work to be welded is to be loaded on the carriage, a welding stage provided in the first carrier passage apart from the loading stage, in which the work is to be welded by an automatic welding machine, a turn-over stage provided in the intersection, in which the carriage is transferred from one of the first and second carrier passages to the other, non-revolutional motor means provided in and along the first and second carrier passages for electromagnetically supporting the carriages and for moving the carriages along the first and second carrier passages, and means for lifting the carriage located at said turn-over stage.

DETAILED DESCRIPTION OF PREFERRED EMBODIMENTS

Figure 1:
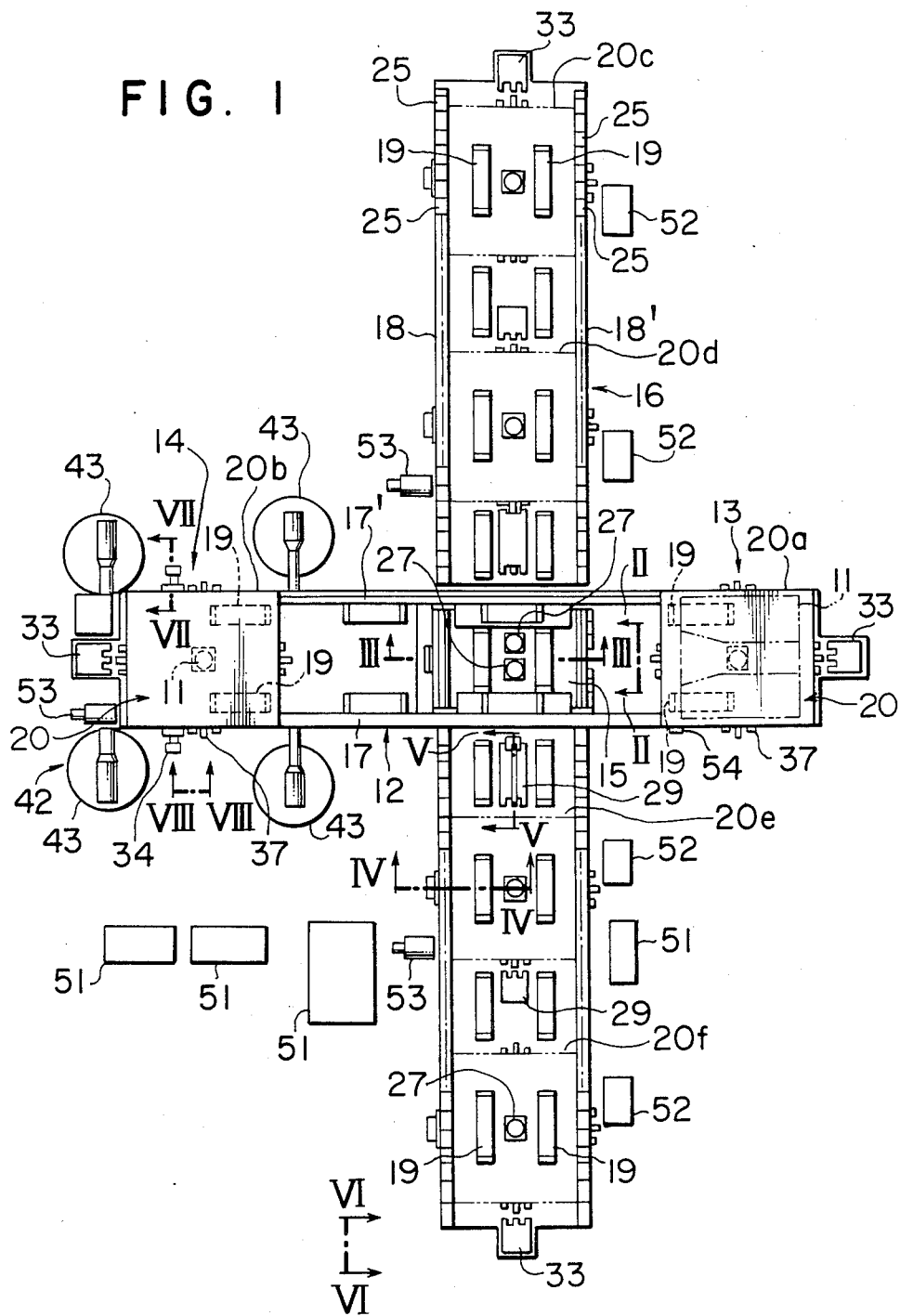
FIG. 1 is a plan view of an embodiment of the welding system in accordance with the present invention.

Referring first to FIG. 1, a first carrier passage 12 and a second carrier passage 16 are arranged orthogonally at different heights. A loading stage 13 and a welding stage 14 are provided on opposite ends of the first carrier passage 12. A turn-over stage 15 is disposed at a portion where both passages 12 and 16 intersect each other. The first carrier passage 12 and the second carrier passage 16 are provided with pairs of rails 17, 17' and 18 18', respectively which extend along the length of the respective carrier passages. Each carrier passage is provided with a plurality of pairs of non-revolutional motors such as linear motors 19 arranged at constant intervals. A plurality of jig unit carriages 20 of different types are mounted on the rails of the respective carrier passages for movement along these rails.

Figure 2A:
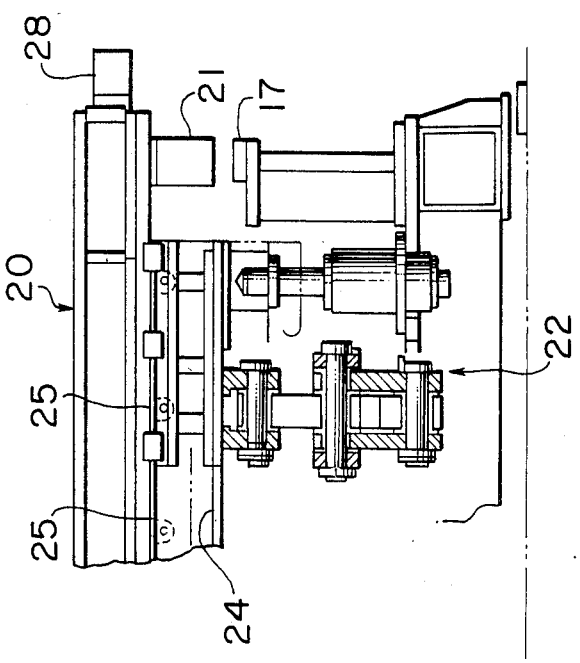
FIGS. 2A and 2B are fragmentary elevational views taken along the line II—II of FIG. 1.

In order to prevent undesirable lateral movement of the carriages 20, one 17' of the rails of the first carrier passage 12 has an upwardly convexed configuration which is complementary to a concaved configuration of the periphery of the wheel 21' of the carriage 20, as will be seen from FIG. 2A. The rail 18 of the second carrier passage 16 is composed of a plurality of rollers 25 as shown in FIG. 3.

Figure 2B:
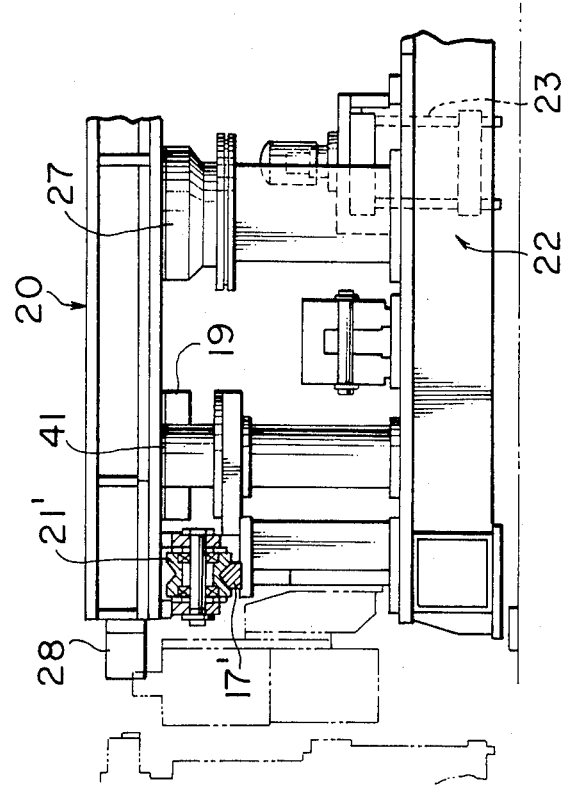

FIG. 2A shows the jig unit carriage 20 at the turn-over stage 15 in a state in which its wheels 20, 21' are brought into engagement with the rails 17, 17' so that it can run along the first carrir passage 12. In contrast, FIG. 2B shows a state in which a lifting unit 22, which will be referred hereinunder, is operated to lift the jig unit carriage 20 at the turn-over stage 15 so that it can run along the second carrier passage 16. The lifting unit 22 includes a cylinder device 23 for lifting a supporting plate 24 which carries the rollers 25, guide rollers 26, the linear motors 19 and magnet brakes 27. Thus, the rollers 25, the guide rollers 26, the linear motors 19 and the magnet brakes 27 are together integratively moved up and down by the operation of the lifting unit 22. The linear motor 19 and the magnet brake 27 shown in FIG. 2A are stationary. A reference numeral 28 designates a stopper bracket provided on each side end of the jig unit carriage 20.

Figure 3:
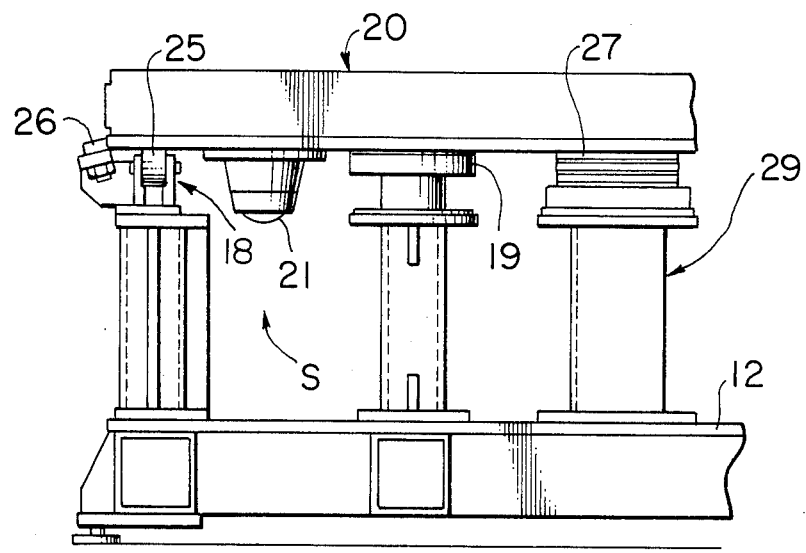
FIG. 3 is a fragmentary elevational view taken along the line III—III of FIG. 1.

FIG. 3 shows the carriage 20 which is movable along the rails 18, 18' of the second carrier passage 16. The magnet brake 27 is disposed in the middle between the rails 18 and 18'. The linear motor 19 is positioned between the rail 18 and the magnet brake 27. The linear motor 19 is disposed such that a space S is formed between itself and the rollers 25 for allowing the wheels 21 of the carriage 20 to pass therethrough. The guide rollers 26 are rotatably mounted on a bracket which supports the rollers 25, and guide the jig unit carriage 20 when the carriage 20 moves along the second carrier passage 16.

Figure 4:
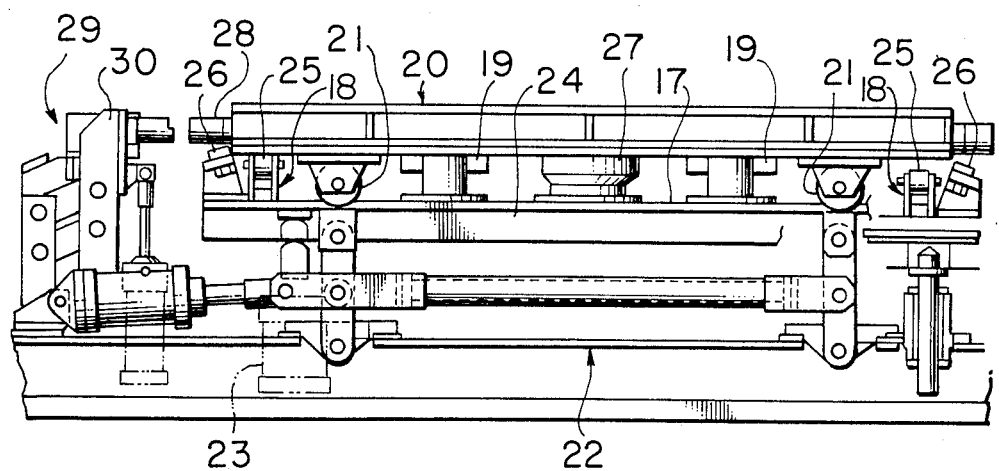
FIGS. 4 and 5 are fragmentary elevational views taken along the lines IV—IV and V—V of FIG. 1, respectively.

FIG. 4 shows the turn-over stage 15 lifted by the lifting unit 22. In this case, the wheels 21 and 21' of the jig unit carriage 20 are disengaged from the rails 17 and 17', and then the rollers 25 directly engage with the lower surface of the jig unit carriage 20. In consequence, the jig unit carriage 20, which has run along the first carrier passage 12, becomes ready for running along the second carrier passage 16. The carriage 20 is adapted to run along the rails 18 with the reduced friction or contact pressure between the carriage 20 and the rails 18 due to the electromagnetic force produced by the linear motor 19.

A reference numeral 29 designates movable stoppers which are movable together with the vertical movement of the supporting plate 24. The movable stopper 29 abuts at the lever 30 thereof against the stopper bracket 28 provided on the carriage 20 for preventing it from moving further.

Figure 5:
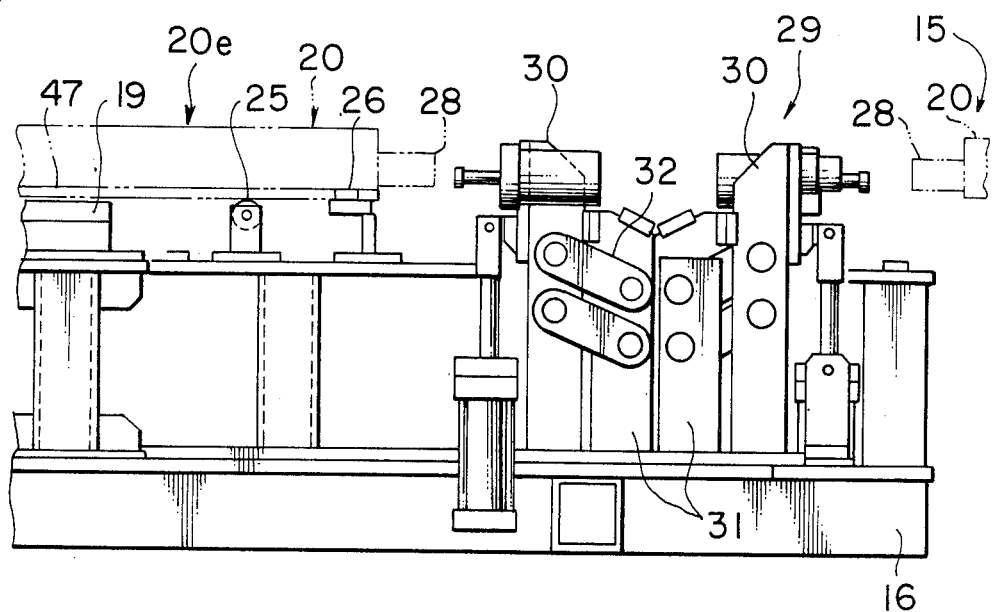
Figure 6:
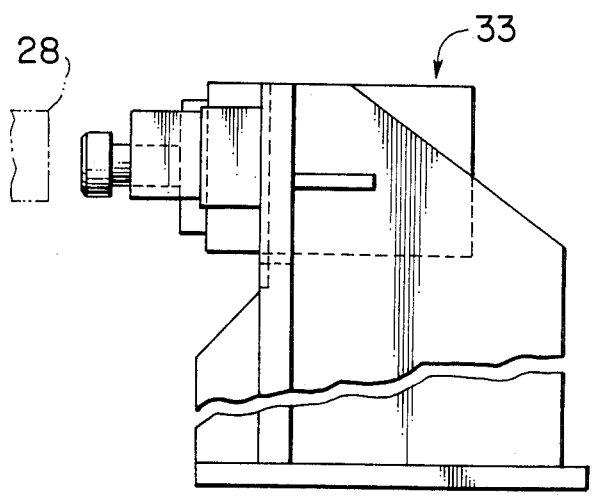
FIG. 6 is a fragmentary elevational view taken along the line VI—VI of FIG. 1.

FIG. 5 shows the movable stoppers 29 in detail, which are disposed between two adjacent predetermined stop positions of the jig unit carriage 20, i.e., a position 20c, a position 20d, the turn-over stage 15, a position 20e and a position 20f. The movable stopper 29 is supported vertically movably through a link mechanism 32 on a bracket 31 fixed to the second carrier passage 16. FIG. 6 shows a stopper 33 provided on ends of the second carrier passage 16. This stopper is the same as the stopper 33 provided on the ends of the first carrier passage 12.

Figure 7:
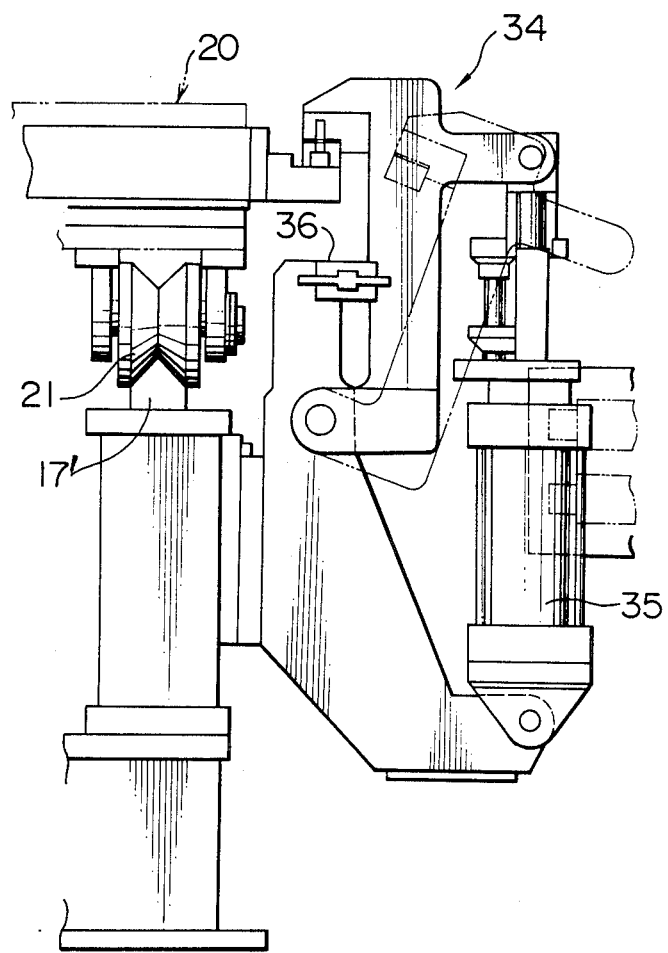
FIG. 7 is a fragmentary elevational view taken along the line VII—VII of FIG. 1.

FIG. 7 shows a manner how the carriage 20 is clamped while it is positioned at the welding stage 14. A pivotable clamp 34 for clamping the jig unit carriage 20 is disposed on each side of the first carrier passage 12. The clamp 34 is driven by a cylinder 35 which is pivotally mounted at one end thereof on the first carrier passage 12. A reference numeral 36 designates a stopper for limiting the stroke of the clamp 34.

Figure 8:
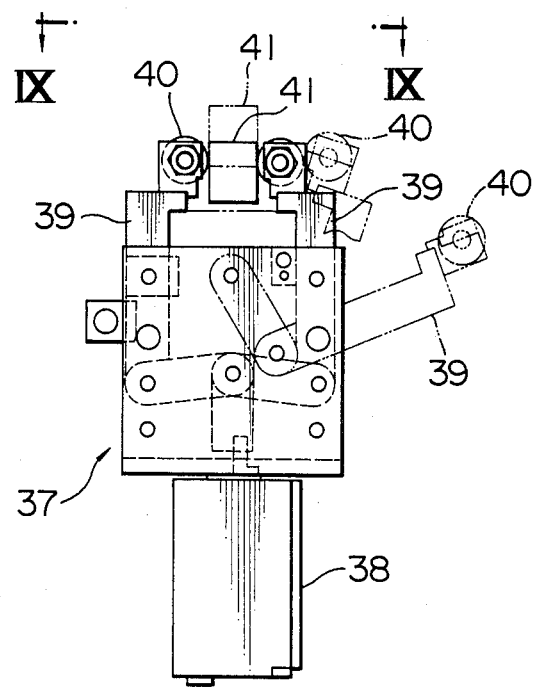
FIG. 8 is a fragmentary elevational view taken along the line VIII—VIII of FIG. 1.
Figure 9:
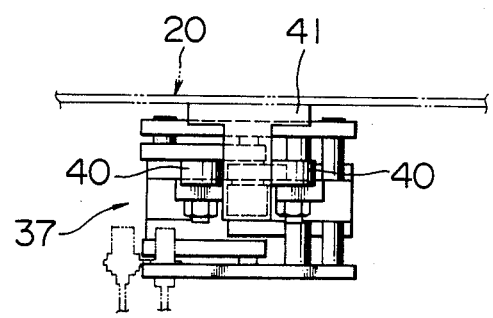
FIG. 9 is a plan view of a clamp unit shown in FIG. 8.

FIGS. 8 and 9 shows a locating clamp unit 37 which locates and clamps the jig unit carriage 20 at the welding processing position indicated by 20b. The locating clamp unit 37 has a pair of clamps 39 driven by a lock cylinder 38, and clamp rollers 40 which are provided on the free ends of these clamps 39. In operation, the clamp rollers 40 cooperate with each other in clamping therebetween a locating bracket 41 secured on a side of the jig unit carriage 20, thus locating the carriage 20 at the welding processing position.

Figure 10:
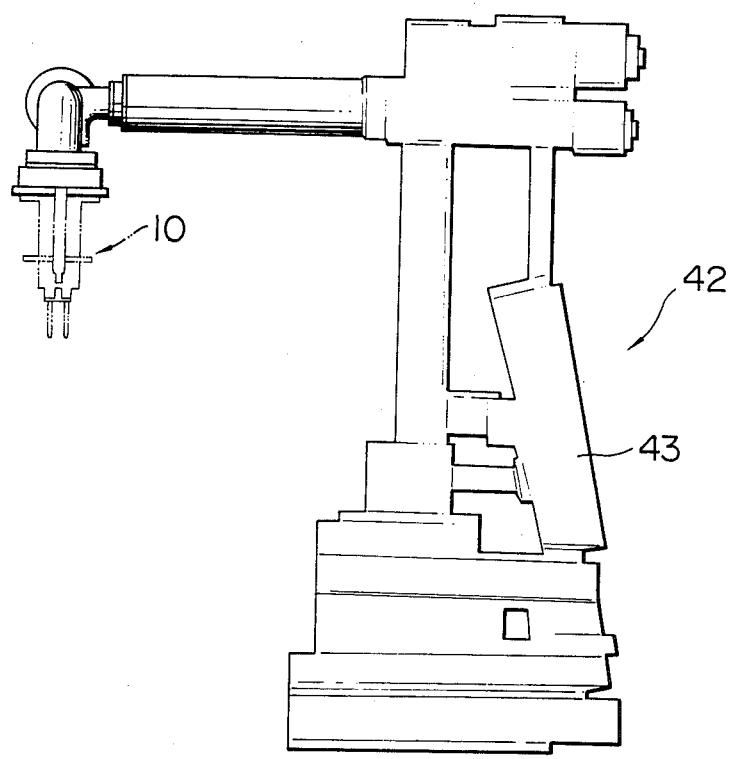
FIG. 10 is a front elevational view of a welding processing unit in the welding system shown in FIG. 1.

FIG. 10 shows a welding processing unit 42 which is composed of a welding robot 43 and a welding gun 10 provided on the distal end of the robot 43.

Figure 11:
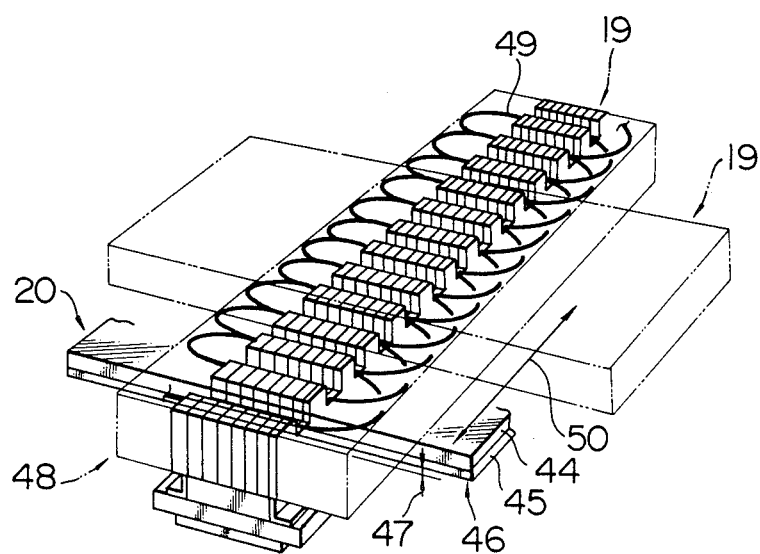
FIG. 11 is a perspective view of a non-revolutional motor incorporated in the welding system shown in FIG. 1.

FIG. 11 is a perspective view of the linear motor 19. A secondary moving member 46 for cooperating with the linear motor 19 is secured to the jig unit carriage 20. The secondary moving member 46 is composed of a magnetic iron plate 44 and a thin aluminum conductive plate 45. The secondary moving member 46 is so disposed that an air gap 47 is formed between the linear motor 19 and the secondary movable member 46. The linear motor 19 has a primary stator 48 with a row of crests and valleys. An exciting coil 49 is placed in each valley. As electric current is supplied to the exciting coil 49, a thrust is generated in a direction of an arrow 50, so that the jig unit carriage 20 is moved from a position above one linear motor 19 to a position above the next linear motor 19.

The welding system shown in FIG. 1 has a control panel 51, a relay box and a valve 52, an air/electricity supply device 53 and an air charging device 54.

The operation of this embodiment is as follows. As the first step, a work 11 is set on the jig unit carriage 20 which is stationed at a position 20a in the loading stage 13. Then, as the operator pushes a start button on the control panel 51, the jig unit carriage 20 is moved by the force of the linear motors 19 along the first carrier passage 12 towards a position 20b in the welding stage 14 through the turn-over stage 15. The jig unit carriage 20 which has reached the position 20b is braked by the magnetic brake 27 and is stopped upon contact with the stopper 33. At the same time, the jig unit carriage 20 is located and locked by the lock clamp unit 37, and is clamped by the clamp 34.

Then, welding processing is automatically conducted by welding guns 10 which are carried by the welding robot 43. During the welding, another jig unit carriage 20 located at for example, a position 20e, and for carrying a frame of another model of automobile to be assembled is moved into the turn-over stage 15. The another jig unit carriage 20 in the turn-over stage 15 is lifted by the lifting unit 22 so that the another carriage 20 is able to run along the second carrier passage 16 across the turn-over stage 15. After completion of the welding on the work 11 in the welding stage 14, the jig unit carriage 20 carrying the work 11 is returned to the turn-over stage 15 along the first carrier passage 12. The lifting unit 22 is then activated to lift the carriage 20, so that the wheels 21 and 21' are separated from the rails 17 and 17', and instead the carriage 20 is supported by the rollers 25. In this state, the carriage 20 becomes movable along the second carrier passage 16. In this state, the polarity of the electric current supplied to the linear motor 19 is altered so that the jig unit carriage 20 is moved from the turn-over stage 15 to a carriage stopping position 20d or 20e along the second carrier passage 16. When the jig unit carriage 20 moves along the second carrier passage 16, the carriage 20 is stopped at respective stopping positions 20c, 20d, 20e and 20f by the stopper 29 shown in FIG. 5. When the lever 30 is dropped down by the link mechanism 32, the jig unit carriage 20 can pass through the stopping position.

Figure 13:
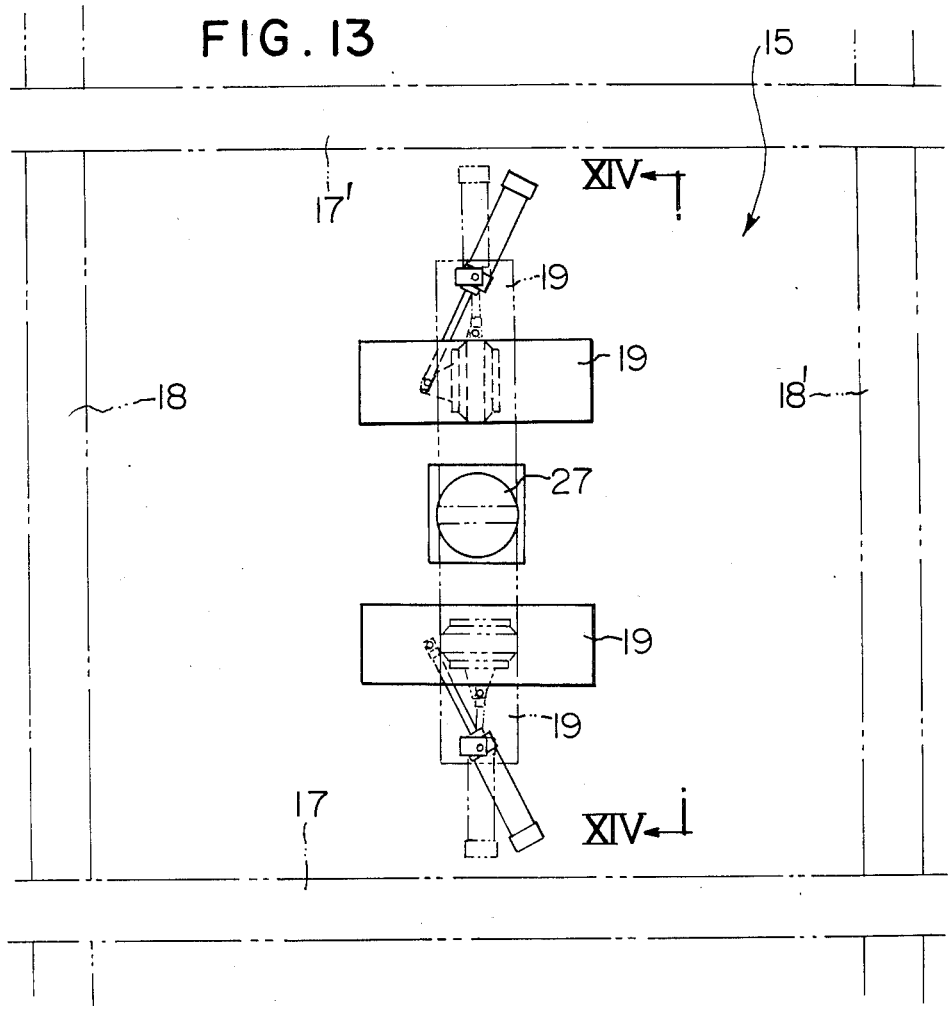
FIG. 13 is a plan view of another embodiment.
Figure 14:
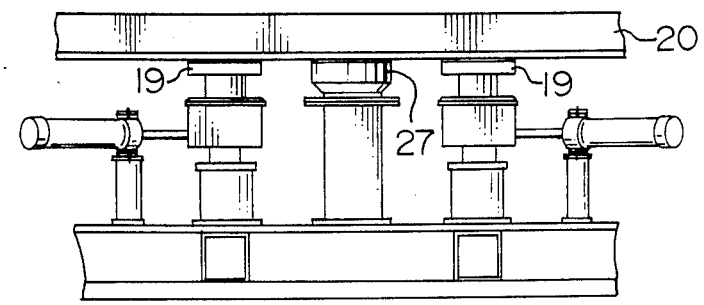
FIG. 14 is a side view taken along the line XIV—XIV of FIG. 13.

In another embodiment of the invention, the turning-over of the jig unit carriage 20 in the turn-over stage 15 is effected by angling the linear motors 19 at 90 degrees in the turn-over stage 15, instead of altering the polarity of the electric current supplied to the linear motor 19. This alternative embodiment is shown in FIGS. 13 and 14.

The work 11 is taken off the jig unit carriage 20 at the position 20d for example by means of a conveyer machine which is not shown. The jig unit carriage 20 is stationed for the next call.

According to the invention, it is possible to automatically conduct welding processing of works of a variety of models of automobile by using different jig unit carriers for the works of different models of automobile.

Figure 12:
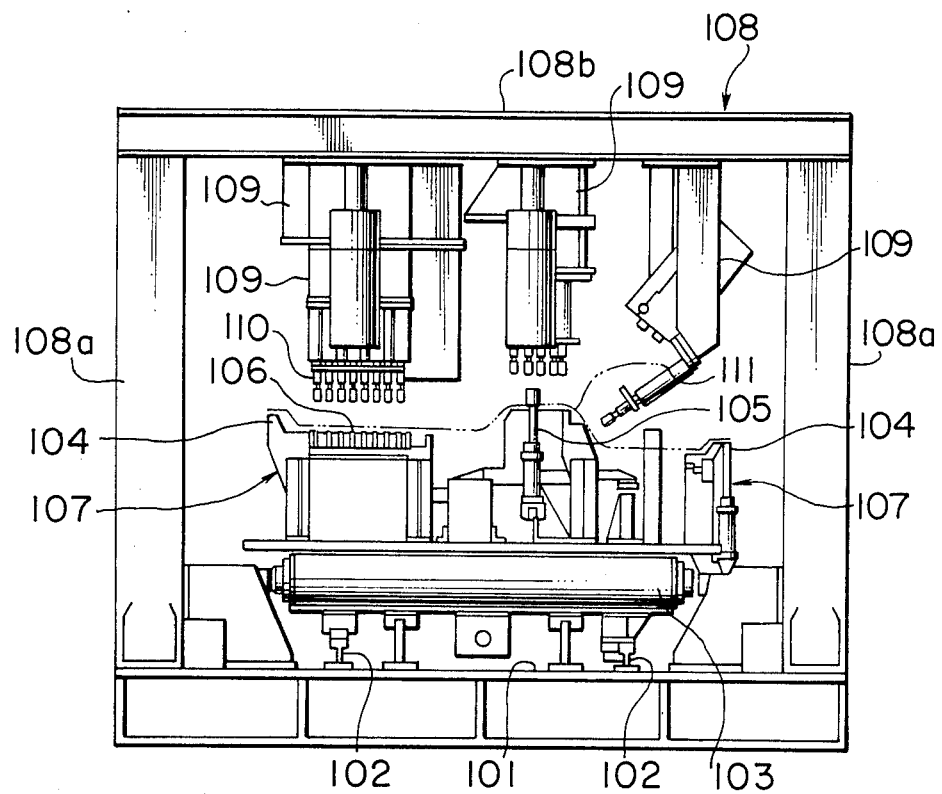
FIG. 12 is a front elevational view of a conventional welding system.

In contrast, a typical conventional welding system as shown in FIG. 12 has suffered from the following disadvantages. Namely, this conventional welding system employs a carriage 103 movable along a pair of rails 102 and 102 laid on a bed 101. The carriage 103 carries a jig unit including a supporting member or members 104 for supporting one or more types of work, a reference pin 105 and back electrodes 106. A frame 108 composed of a pair of posts 108a and 108a and a bar 108b extending between these posts 108a and 108a is secured to the bed 101. A welding gun 110 of a multi-spot welder is fixed to an upper portion of the frame 108 through a gun bracket 109. The jig unit carriage 103 carrying a floor part 111 as the work mounted on the back electrodes 106 is moved to a position under the frame 108, where spot welding is conducted by a welding gun 110. For these reasons, this conventional welding system can employ only one type of work.

As has been described, the present invention offers the following advantages. First of all, it is to be understood that the jig unit carriage 20 can be conveyed at a high speed and can locate the same with a high positional precision. Furthermore, the convey of the jig unit carriage can be conducted in a noiseless and dust-free manner with reduced contact pressure and friction, by virtue of the use of non-revolutional motors. The non-revolutional motors also ensures a high precision of positioning of the carriage. Furthermore, the possibility of occurrence of troubles is reduced as compared with conventional systems thanks to the reduced number of mechanical movable parts required for the driving of the carriages. The design also is facilitated because the number of specific parts to be designed is reduced. In addition, turning of the carriage and braking of the same are facilitated owing to the use of non-revolutional motors. It is to be noted also that supply of air and electric power to the movable parts is not necessary except the supply of air for clamping and unclamping the carriages. This eliminates the necessity for the air and electric power supply means such as trolley cables necessitated by the conventional systems.

As has been described, according to the present invention, there is provided a welding system in which a plurality of jig unit carriages carrying weld parts for assembly of different models of automobiles are conveyed along carrier passages in a floating manner by means of contactless non-revolutional motors such as linear motors. The contactless non-revolutional motors enables an easy acceleration and deceleration of the carriages, as well as an easy change of the running directions.

According to the present invention, therefore, it is possible to weld parts of a variety of types and models of automobiles. In addition, the production efficiency and the quality of the product are very much improved thanks to the high-speed running and high precision of position control of the carriages, as well as an easy change of the path along which the carriages run.

What is claimed is:

1. A welding system comprising:
   a first carrier passage;
   a second carrier passage intersecting said first carrier passage at an intersection thereof with a height difference;
   a plurality of carriages for movement along said first and second carrier passages;
   a loading stage provided in said first carrier passage, in which a work to be welded is to be loaded on one of said plurality of carriages;
   a welding stage provided in said first carrier passage apart from said loading stage, in which a work is to be welded by an automatic welding machine;
   a turn-over stage provided in said intersection, in which one of a plurality of said carriages is transferred from one of said first and second carrier passages to the other;
   non-revolutional motor means provided in and along said first and second carrier passages for electromagnetically supporting each of said plurality of carriages and for moving said carriages along said first and second carrier passages; and
   means for lifting each said plurality of carriages located at said turn-over stage.

2. A welding system according to claim 1, wherein said non-revolutional motor means include, in said turn-over stage, a pair of non-revolutional motors each capable of changing the direction thereof.

3. A welding system according to claim 1, wherein said non-revolutional motor means include, in said turn-over stage, a pair of non-revolutional motors and means for changing-over the polarity of exciting current to be supplied to said nonrevolutional motors.

4. A welding system according to claim 2, wherein each of said non-revolutional motors is a linear motor.

* * * * *